US010370607B2

(12) United States Patent
Mariani et al.

(10) Patent No.: US 10,370,607 B2
(45) Date of Patent: Aug. 6, 2019

(54) COMPOSITIONS BASED ON ETHYLENE-VINYL ACETATE COPOLYMERS AND THEIR USE AS ANTI-GELLING ADDITIVES OF PARAFFINIC CRUDE OILS

(71) Applicants: versalis S.p.A., San Donato Milanese (MI) (IT); ENI S.p.A., Rome (IT)

(72) Inventors: Paolo Mariani, Milan (IT); Michela Agnoli, Verona (IL); Alessandro Casalini, Mantova (IL); Massimo Merlini, Milan (IL)

(73) Assignees: versalis S.p.A., San Donato Milanese (MI) (IT); ENI S.p.A., Rome (IT)

( * ) Notice: Subject to any disclaimer, the term of this patent is extended or adjusted under 35 U.S.C. 154(b) by 0 days.

(21) Appl. No.: 15/102,138

(22) PCT Filed: Dec. 5, 2014

(86) PCT No.: PCT/IB2014/066638
§ 371 (c)(1),
(2) Date: Jun. 6, 2016

(87) PCT Pub. No.: WO2015/083131
PCT Pub. Date: Jun. 11, 2015

(65) Prior Publication Data
US 2017/0029732 A1 Feb. 2, 2017

(30) Foreign Application Priority Data
Dec. 6, 2013 (IT) .............................. MI2013A2043

(51) Int. Cl.
*C10M 145/08* (2006.01)
*C10L 1/197* (2006.01)
*C10L 10/16* (2006.01)
*C08L 23/08* (2006.01)

(52) U.S. Cl.
CPC .......... *C10L 1/1973* (2013.01); *C08L 23/0853* (2013.01); *C10L 10/16* (2013.01); *C08L 2205/025* (2013.01); *C10L 2230/14* (2013.01); *C10L 2250/04* (2013.01); *C10L 2300/20* (2013.01); *C10L 2300/30* (2013.01)

(58) Field of Classification Search
CPC .......... C10M 145/08; C10M 2209/062; C10N 2030/02; C10L 2270/10
USPC ........................................................ 508/475
See application file for complete search history.

(56) References Cited

U.S. PATENT DOCUMENTS

| | | | | |
|---|---|---|---|---|
| 3,675,671 A * | 7/1972 | Sweeney | ................. | C10L 1/143 137/13 |
| 3,693,720 A * | 9/1972 | McDougall | ............ | C09K 8/524 166/304 |
| 4,178,951 A * | 12/1979 | Sweeney | ................ | C10L 1/1973 137/13 |
| 5,078,917 A * | 1/1992 | Litt | ...................... | C10M 145/08 508/472 |
| 5,554,200 A * | 9/1996 | Brod | .................... | C08L 23/0861 44/393 |
| 5,593,466 A * | 1/1997 | Tack | ...................... | C10G 73/04 44/398 |
| 5,718,734 A * | 2/1998 | Davies | .................... | C08L 23/08 44/393 |
| 6,238,447 B1 * | 5/2001 | More | .................... | C08F 210/02 44/393 |
| 6,309,431 B1 * | 10/2001 | Becker | .................... | C10L 1/143 44/393 |
| 6,458,175 B1 * | 10/2002 | Lehmann | ................ | C10L 1/143 44/393 |
| 6,495,495 B1 * | 12/2002 | Alger | ..................... | C10L 1/143 508/475 |
| 6,599,335 B1 * | 7/2003 | Krull | ..................... | C08F 210/00 208/15 |
| 6,846,338 B2 * | 1/2005 | Krull | ..................... | C10L 1/1955 44/393 |
| 7,713,316 B2 * | 5/2010 | Krull | ..................... | C08F 210/02 44/393 |
| 2011/0067295 A1 * | 3/2011 | Castro Sotelo | ......... | C10L 1/143 44/393 |
| 2014/0094537 A1 * | 4/2014 | Schmidt | ................ | C10L 1/1225 523/122 |
| 2014/0165457 A1 * | 6/2014 | Castro | ................. | C08F 255/026 44/393 |
| 2014/0166287 A1 * | 6/2014 | Faul | ..................... | C10M 177/00 166/305.1 |

(Continued)

FOREIGN PATENT DOCUMENTS

EA 200970105 A1 6/2009
EP 0 254 284 A1 1/1988
(Continued)

OTHER PUBLICATIONS

International Search Report and Written Opinion dated Feb. 25, 2015 in PCT/IB2014/066638 filed Dec. 5, 2014.
(Continued)

*Primary Examiner* — Ellen M McAvoy
(74) *Attorney, Agent, or Firm* — Oblon, McClelland, Maier & Neustadt, L.L.P.

(57) ABSTRACT

A polymeric composition suitable for lowering the Pour Point of paraffinic crude oils comprising a synergic mixture including at least two ethylene-vinyl acetate copolymers respectively having an average molecular weight Mw lower than 130,000 Dalton (measured via GPC), a content of vinyl acetate monomer ranging from 15 to 50% by weight, with the proviso that the content of vinyl acetate monomer in the respective copolymers differs from one copolymer to another, by over 5%, on a weight basis.

14 Claims, No Drawings

(56) References Cited

U.S. PATENT DOCUMENTS

2015/0369822 A1* 12/2015 Strandburg ........ G01N 33/6887
506/9
2016/0230103 A1* 8/2016 Schmidt ................ C10G 75/00

FOREIGN PATENT DOCUMENTS

| | | |
|---|---|---|
| EP | 0 406 684 A1 | 1/1991 |
| KZ | 16493 | 11/2005 |
| KZ | 24387 | 5/2013 |
| KZ | 24388 | 5/2013 |
| RU | 2098459 C1 | 12/1997 |
| RU | 2137813 C1 | 9/1999 |
| RU | 2 508 393 C1 | 2/2014 |

OTHER PUBLICATIONS

International Preliminary Report on Patentability dated Mar. 3, 2016 in PCT/IB2014/066638 filed Dec. 5, 2014.

Office Action dated Jun. 27, 2017. received Aug. 9, 2017, in Kazakhstan patent application No. 2016/0529.1 (with English translation).

Russian Office Action & Patent Search Report dated Jun. 21, 2018 in Russian Patent Application No. 2016124758/05(068858) filed Dec. 5, 2014 (w/ English translation).

* cited by examiner

COMPOSITIONS BASED ON ETHYLENE-VINYL ACETATE COPOLYMERS AND THEIR USE AS ANTI-GELLING ADDITIVES OF PARAFFINIC CRUDE OILS

The present invention relates to compositions based on ethylene-vinyl acetate copolymers and their use as anti-gelling additives of crude oils.

More specifically, the present invention relates to synergic mixtures of ethylene-vinyl acetate (EVA) copolymers and a process for significantly decreasing the gel point (hereinafter Pour Point or PP) of paraffinic crude oils, particularly paraffinic crude oils having an average paraffin content, mainly linear, ranging from 5 and 35% by weight and characterized by a Pour Point higher than 10° C.

The present invention can therefore be applied in the so-called field of "Pour Point Depressants" (hereinafter PPD) i.e. substances mainly of polymeric nature which are able to reduce the Pour Point temperature of the fluids treated, and in particular to bring it below the temperature considered suitable for a certain use of the fluid or for its transportation.

In particular, the present invention refers to the application field of substances suitable for reducing the PP of crude oils, initially having a PP higher than 10° C., and in which said characteristic can be substantially attributed to the uncontrolled formation of crystals of oil waxes with the proceeding of the cooling of the crude oil with respect to the extraction temperature from its original geological formation, or to its variation in composition connected with normal stabilization procedures of crude oil suitable for allowing its transportation and commercialization.

In the present invention, all details of the technical solution proposed should be considered as being preferred, even if not specifically declared, and the use of the term "comprising" can be substituted, when required and anywhere in the text and claims, by the term "consisting of".

Said PPD substances must generally be dissolved in the fluid to be treated at a suitable temperature, conventionally called activation temperature (i.e. such as to allow the melting of the above-mentioned wax crystals, present in the fluid considered), and under conditions (for example, time) suitable for obtaining a good mixing of the additive in the fluid itself.

Following appropriate treatment, it can be observed how the crude oil shows a substantially different behaviour, revealing, in particular, a significant decrease in the PP, which makes it suitable for commercialization or in any case for its subsequent intended use.

The performances of the additives, also those object of the present invention, are generally preliminarily evaluated with laboratory methods, which require the use of specific standardized equipment according to the methods ASTM D97 and ASTM D5853 and reference will be made to these methods hereunder.

As it is known, the problem of the gelling of crude oils with a decrease in the temperature, due to the crystallization of the paraffinic components, is extremely important for the transportation of crude oils in pipelines. Various solutions can be adopted for handling crude oils characterized by a high content of waxes or paraffins, among which: (i) dilution by the addition of low-boiling light fractions (diesel or kerosene), (ii) keeping the tanks and pipelines at a sufficiently high temperatures so to avoid the crystallization of the paraffins, (iii) addition of additives capable of reducing the gelling temperature (Pour Point Depressant additives). The first two solutions are disadvantageous from an economic and/or energy point of view and are consequently not among those preferred. The use of additives at low concentrations, on the contrary, capable of hindering the crystallization of the paraffins by modifying the morphology of the crystals, is a common practice.

Emulsions, suspensions or solutions containing dispersed/dissolved polymers in aqueous and/or organic solvents are currently used as Pour Point Depressants. These polymers can also be extremely complex, generally based on the use of monomers (and/or comonomers) with parts having a different polarity and in any case generally with the presence of important paraffin sequences, both lateral and on the main chain (backbone).

Ethylene-vinyl acetate, EVA, copolymers or, more generally, ethylene-alkyl vinyl ester and polymers of acrylic esters (or their copolymers with ethylene) deriving from long-chain alcohols are commonly used as Pour Point Depressant additives for crude oils in concentrations varying from 50 pp, to 1,000 ppm of additive within the crude oil. Reference should be made, for example, to EP 186,009, Canadian patents 1,231,659 and 2,008,986, and German patents 2,048,308 and 3,613,247.

Polymeric resins synthesized through the copolymerization of ethylene with acrylonitrile or characterized by more complex compositions, such as terpolymers or tetrapolymers with maleic anhydride, carbon monoxide, styrene, vinyl halides, acrylamides, or (meth)acrylic acid, are also proposed in literature. Reference should be made, for example, to EP 034,008, Chinese patent 1,141,372, Chinese patent application 2010/1845299 and Canadian patent 2,008,986.

The main action of these additives consists in co-crystallization with the paraffins present in the oil, altering/weakening their crystalline structure.

They also act as nucleation seeds on which the crystals can grow, thus giving rise to numerous small-sized and therefore less critical crystals.

The additive is usually conveyed inside the oil by dissolution in solvents or the preparation of emulsions using an appropriate emulsifier (German patent 3,613,247). As described in German patent 2,048,308, single grades or mixtures of additives having different molecular weight/composition are normally used for improving or prolonging the effectiveness of the Pour Point Depressant additive in the crude oil of interest. Surfactants are sometimes used, for example petroleum sulfonates, polyoxyethylene-alkyl amines, which are adsorbed on the surfaces of the paraffin crystals, jeopardizing the further growth of the crystals.

In particular, among further documents of the state of the art, the following documents are mentioned:
  i. U.S. Pat. No. 4,045,360. This document describes the use of synergic mixtures (1:2/5) of an ethylene copolymer with unsaturated mono-ethylene esters (vinyl acetate, for example) and one or more "fatty derivative(s)", such as a long-chain alcohol.

ii. U.S. Pat. No. 4,905,762. This document describes the use of a single EVA copolymer having a composition ranging from 62 to 66% by weight of ethylene and from 34 to 38% by weight of vinyl acetate, with a molecular weight lower than 35,000 Dalton.

iii. U.S. Pat. No. 7,541,315. This document describes the use of suitable mixtures of solvents, selected from a list of "good solvents" and "less good solvents", which allow the concentration of active phase of the solution to be maximized with respect to properties such as cloud point and pour point of the treating solution, enabling, for example, easy use in cold climates.

iv. U.S. Pat. No. 4,156,434. This document describes the use of formulations on "vacuum gas oil" of quotas of asphaltene crude oil joined with a formulation based on an EVA copolymer ($M_w$=17,000-30,000 Dalton and 10-45% by weight of vinyl acetate) and ABA block copolymers based on long-chain esters of acrylates or methacrylates with a suitable selection of the blocks.

v. U.S. Pat. No. 5,078,917. This document describes the use of formulations on "white oil" based on EVA (Mn=500-10,000 Dalton and 25-55% by weight of vinyl acetate) within the range of 100 to 10,000 wppm. Terpolymers with acrylates and alpha-olefins are also cited.

EP 406,684 discloses vinylacetate based additives for middle distillates, particularly diesel fuels, which additives hinder the settling of paraffin crystals in the fuels and improve their filterability.

EP 254,284 discloses a process for improving the flowability of mineral oils and mineral oil distillates characterized by adding to said mineral oil and mineral oil distillates an ethylene-vinylacetate-diisobutylene terpolymer and an ethylene-vinylacetate copolymer.

On the basis of the above, it is therefore evident that the cooling of oil causes the gradual crystallization of the paraffins contained in it, with the consequent formation of a three-dimensional network capable of withholding the portion of crude oil still liquid. This implies an increase in the viscosity of the oil until it reaches its complete gelation, creating serious problems during the transportation of the crude oil in the pipeline, above all after prolonged days of inactivity. Even a few percentages of paraffinic fractions in crude oils can be sufficient for creating these problems. Finally, the paraffin crystals tend to precipitate on the walls of the pipelines, thus progressively reducing their effective section.

The main problem relating to the formulation and use of Pour Point Depressant additives relates to the efficiency of the additive, i.e. obtaining a significant lowering of the gel point in the crude oil of interest.

The Applicant has now found that the Pour Point Depressant additives of the present invention, comprising certain mixtures or solutions of mixtures of Ethylene-Vinyl acetate (EVA) copolymers, each of them having a different content of vinyl acetate comonomer, guarantee a better effectiveness in lowering the gel point of crude oils having a high paraffin content with respect to the additives of the known art.

A strong synergic effect has in fact been observed between the components of the mixtures used with respect to the single EVA grades (copolymers), in lowering the Pour Point of said crude oils. The use of EVA grades characterized by different percentages of Vinyl Acetate (VA) comonomer, suitably selected, and therefore by polyethylene fractions having a different average length, allows the range of action of the Pour Point Depressant additive to be widened, making it possible to act on a greater fraction of paraffins present in the crude oil of interest and lowering the gel point of the crude oil more effectively. In particular, better results have been obtained by combining the mixture of EVA copolymers with a dispersing agent (surfactant) having a HLB>10. The addition of the dispersing agent allows the deposition of paraffinic residues to be slowed down or prevented, whereas it has proved to be completely ineffective if used alone.

An object of the present invention therefore relates to a synergic composition, also described in the enclosed claims, suitable for decreasing the Pour Point of paraffinic crude oils, also below 10° C., comprising (or consisting of) at least two ethylene-vinyl acetate copolymers, possibly dissolved in a solvent, respectively having a weight average molecular weight $M_W$ lower than 130,000 Dalton (measured via GPC), a content of vinyl acetate monomer ranging from 15 to 50% by weight, with the proviso that the content of vinyl acetate monomer in the respective copolymers, differs, with respect to each other, by over 5% on a weight basis. In other words, the difference in the concentration of the VA comonomer, between one EVA copolymer and another, is higher than 5% by weight.

Alternatively, the synergic mixture comprising at least two ethylene-vinyl acetate copolymers having a different concentration of vinyl acetate monomer, can be substituted by a mixture, also synergic, comprising or consisting of one or more ethylene-vinyl acetate copolymers, as above, and at least one alkyl (meth)acrylate polymer wherein the alkyl group or alkyl side chain contains from 8 to 25 carbon atoms. The concentration of alkyl(meth)acrylate polymer in this second synergic composition, which is a further object of the present invention, ranges from 1 to 50% by weight.

EVA copolymers are semi-crystalline polymeric resins synthesized through the copolymerization of ethylene with the second polar VA monomer, by means of a high-pressure process through radical synthesis. During the synthesis process, the comonomer is inserted in a purely random way inside the polymeric chains. As the reaction kinetics of ethylene and vinyl acetate are very similar, the content of comonomer in the EVA copolymers is in any case equal to the VA concentration in the reaction mixture, also under the experimental conditions adopted. As the comonomer is inserted randomly and not regularly in the chains, however, the EVA copolymers are characterized by polyethylene sections, between one molecule of VA and the next one, having a different length, i.e. by a distribution of "polyethylene" fractions composed of a different number of carbon atoms. The most probable length of the polyethylene sections, on which the distribution is centred, depends directly on the content of VA (Salyer, Kenyon, Journal of Polymer Science: Part A-1, Vol. 9 (1997), 3083-3103). Numerous properties of EVA copolymers depend on the percentage of VA comonomer and, among these, for example, also the crystallization point which decreases linearly with an increase in the content of VA in the chains.

The polyethylene part of the EVA copolymers is capable of co-crystallizing with the paraffin fractions present within the crude oils, whereas the polar acetate group prevents the excessive growth of the crystals by altering or disturbing the crystalline structure. The co-crystallization will improve when the paraffins and polyethylene sections of the EVA copolymers have a comparable length.

As crude oils are characterized by various paraffinic fractions having different lengths, the advantage of using the mixtures of EVA grades having a different VA content, instead of single grades, lies in the fact that the distribution of polyethylene sections that can co-crystallize with a wider range of paraffins, is enlarged, thus decreasing the PP more effectively. On the basis of what is specified above, the use of EVA with contents of VA which are such as to be at least partially immiscible with each other, i.e. each maintaining a distinct crystallization point when mixed with each other, proves to be particularly effective.

According to a preferred aspect of the synergic composition object of the present invention, the number of EVA copolymers ranges from 2 to 6, more preferably from 3 to 5. EVA copolymers having a weight average molecular weight $M_W$ ranging from 15,000 to 100,000 Dalton, more preferably from 25,000 to 80,000 Dalton, are preferred. The minimum concentration of a generic EVA copolymer in the synergic mixture is at least 5% by weight, preferably from 10 to 60% by weight.

Furthermore, according to the present invention, the content of vinyl acetate monomer in the EVA copolymer preferably ranges from 18 to 45% by weight, more preferably from 20 to 40% by weight, said content, on a weight basis, differs from one copolymer and another by over 5%, preferably from 7 to 22%.

The mixtures of EVA copolymers object of the present invention, can be applied at a very low concentration, for example, from 50 to 1,500 ppm (weight) of overall copolymer with respect to the crude oil, preferably from 100 to 1,000 ppm, after being dissolved, for example, in a solution of a suitable solvent or carrier.

In particular, mixtures of 3 EVA copolymers with a VA content of 20-30-40% or 24-33-40% respectively, for example, are considered as being particularly preferred. Preferably, the weight proportion of the copolymers of the mixture can be substantially defined empirically with reference to the molecular weight distribution of the waxes/paraffins of the crude oil (with reference to the linear paraffinic chains having a carbon atom content (C) of between 18 and 50). It is also effective to select the additives by testing them beforehand individually in a pre-determined amount (for example, 1,000 ppm (weight) each), and subsequently, after identifying the VA range which interferes most with the PP, adding the other two vicinal additives (with ΔVA equal to about 7 in an amount of about ¼ of the most effective additive). The mixture thus formed can be re-used at 1,000 ppm (weight), for example, obtaining an improved result. It may also be convenient to use two vicinal additives having a VA content which is such as to comprise that of the most effective additive in equivalent amounts, obtaining an improved effect together with a third additive with a content equal to ¼ of the first two. Each of the above-mentioned copolymers can be substituted by a mixture of two copolymers having an average VA equal to that desired and with a VA of the single components which does not differ by more than 5% (therefore, for example, 20-(28-33)-40%).

The presence of various EVA copolymers which co-crystallize with the n-paraffins present in the crude oil, allows disturbing elements to be introduced during the whole crystallization phase of the same petroleum waxes, obtaining the modification of the crystals of n-paraffins thus formed within the whole range of crystallization temperatures for crude oils characterized by a high content of waxes and a high Pour Point.

The synergic mixture of EVA copolymers object of the present invention can be advantageously used together with a surfactant with a Hydrophilic Lipophilic Balance (HLB) ≥10, preferably ranging from 10 to 15, such as, for example, an ethoxylated $C_8$-$C_{18}$ alkyl-phenol, ethoxylated or propoxylated $C_8$-$C_{18}$ alcohols, $C_2$-$C_6$ alkylates of sorbitol and mixtures thereof.

The synergic mixture of EVA copolymers object of the present invention, can also be associated with the use of a different type of PPD, such as an alkyl(meth)acrylate polymer (adjuvant) wherein the alkyl group or alkyl side-chain contains from 8 to 25 carbon atoms, preferably from 12 to 22, in order to obtain particularly low PPs, lower than 0° C. In particular, adjuvants consisting of mixtures of said acrylic polymers are suitable, wherein from 10 to 40% by weight consists of polymers characterized by $C_{12}$-$C_{14}$ alkyl side-chains (alkyl radicals), from 40 to 80% by weight by $C_{16}$-$C_{18}$ alkyl side-chains (alkyl radicals) and from 0 to 30% by weight by $C_{18}$-$C_{22}$ alkyl side-chains (alkyl radicals).

The PPD adjuvant, when present, is used in a quantity ranging from 1 to 50% by weight, preferably from 7 to 35% by weight of the overall synergic mixture with the EVA copolymers. Synergic mixtures containing from 10% to 30% by weight of polyalkyl(meth)acrylate adjuvant are particularly preferred.

A further object of the present invention, as described in the enclosed claims, relates to a process for reducing the Pour Point of paraffinic crude oils having a content of paraffins>$C_5$, for example $C_5$-$C_{100}$, ranging from 5 to 35% by weight, preferably from 10 to 25% by weight, said process comprising (or consisting in) adding, to the crude oil, the synergic mixture of EVA copolymers, also object of the present invention and previously described, possibly pre-diluted, according to methods well-known to skilled persons in the field, in an organic solvent, preferably aromatic, such as toluene, xylene, ethylbenzene, "naphtha 100 solvent", "naphtha 150 solvent"; aliphatic solvent such as hexane, cyclohexane, decalin; polar solvents such as, for example, acetophenone, cyclohexanone; or mixtures thereof, preferably the acetophenone/aromatic mixture, in a 30/70 mixture (parts by weight).

A third object of the present invention, also described in the enclosed claims, relates to a paraffinic crude oil characterized by a Pour Point also lower than 10° C. comprising (or consisting of):

i. a paraffinic crude oil with an average content of paraffins higher than 5% by weight; and ii. 50-1,500 ppm (by weight) with respect to the crude oil, of a synergic composition comprising (or consisting of)

at least two ethylene-vinyl acetate copolymers, possibly dissolved in a solvent, respectively having a weight average molecular weight $M_W$ lower than 130,000 Dalton (measured via GPC), a content of vinyl acetate monomer ranging from 15 to 50% by weight, with the proviso that the content of vinyl acetate monomer in the respective copolymers differs from one another by a value higher than 5% on a weight basis.

The present invention will be now described with reference to the following examples which represent an illustrative and not limiting embodiment of the present invention.

Mixtures of EVA grades were used, characterized by VA percentages ranging from 12 to 45% by weight, a fluidity index (ISO 1133) ranging from 3 g/10' to 800 g/10' and a weight average molecular weight (measured via high-temperature GPC) lower than 130,000 Dalton.

Solutions of EVA copolymers were prepared in aromatic solvents (xylene, xylene/acetophenone mixtures 70/30) in concentrations ranging from 1% to 10% of the polymeric part; the mixture of EVA grades used (the VA percentage and the ratios between the components) is created in relation to the content and composition of the paraffinic fraction of the crude oil. The mixture of EVA copolymers was diluted in the solvent by hot mixing (70-85° C.) for at least 30-60 minutes.

The additive and ethoxylated nonylphenol surfactant were added to the crude oil at room temperature, heating the crude oil only to the temperature sufficient for making it fluid (T=30-40° C.), or after exceeding its activation temperature, or at an intermediate temperature. The sample was then mixed by vigorous manual stirring. The surfactant can be added to the crude oil either individually or dissolved in solution with the EVA copolymers.

In particular, the crude oil subjected to the test is a paraffinic crude oil having a PP of 27° C., characterized by a high paraffin fraction (21% m/m, concentration measured by applying the method BP237).

The Pour Point of the crude oil as such and containing additives was measured according to the provisions of the standard ASTM D5853 and ASTM D97, after "activation" of the crude oil by thermal treatment at a temperature of about 85° C.

The results obtained are provided hereunder. Blank tests were carried out to verify that the solvent did not influence the result.

The Pour Point values measured for the EVA additives added individually are also indicated (comparative examples A-N and P) at two different concentrations in the crude oil (500 ppm and 1,000 ppm by weight).

TABLE 1

(comparative results)

| | | | | Additive (ppm) | Surfactant (ppm) | PP (° C.) |
|---|---|---|---|---|---|---|
| | Paraffinic Crude oil | | % | 0 | 0 | 27 |
| A | 1% Additive in Xylene | EVA (18% VA, 150 g/10') | 100 | 500 | 0 | 27 |
| | | | | 1000 | 0 | 21 |
| B | 1% Additive in Xylene | EVA (20% VA, 20 g/10') | 100 | 500 | 0 | 24 |
| | | | | 1000 | 0 | 27 |
| C | 1% Additive in Xylene | EVA (23% VA, 5.5 g/10') | 100 | 500 | 0 | 15 |
| | | | | 1000 | 0 | 12 |
| D | 1% Additive in Xylene | EVA (28% VA, 25 g/10') | 100 | 500 | 0 | 18 |
| | | | | 1000 | 0 | 15 |
| E | 1% Additive in Xylene | EVA (28% VA, 40 g/10') | 100 | 500 | 0 | 18 |
| | | | | 1000 | 0 | 15 |
| F | 1% Additive in Xylene | EVA (28% VA, 150 g/10') | 100 | 500 | 0 | 15 |
| | | | | 1000 | 0 | 12 |
| G | 1% Additive in Xylene | EVA (28% VA, 800 g/10') | 100 | 500 | 0 | 18 |
| | | | | 1000 | 0 | 12 |
| H | 1% Additive in Xylene | EVA (33% VA, 45 g/10') | 100 | 500 | 0 | 18 |
| | | | | 1000 | 0 | 27 |
| I | 1% Additive in Xylene | EVA (39% VA, 60 g/10') | 100 | 500 | 0 | 24 |
| | | | | 1000 | 0 | 27 |
| L | 1% Additive in Xylene | Polyacrylate $C_{12}$-$C_{18}$ | 100 | 500 | 0 | 27 |
| | | | | 1000 | 0 | 21 |
| M | 1% Additive in Xylene | Polyacrylate $C_{12}$-$C_{22}$ | 100 | 500 | 0 | 21 |
| | | | | 1000 | 0 | 21 |
| N | 1% Additive in Xylene | Polyacrylate $C_{18}$-$C_{22}$ | 100 | 500 | 0 | 24 |
| | | | | 1000 | 0 | 24 |
| P | 1% Additive in Xylene | Polyacrylate $C_{12}$-$C_{22}$ EVA (28% VA, 800 g/100') | 50 50 | 1000 | 200 | 18 |

TABLE 2

(Results according to the invention)

|  |  |  | Additive (ppm) | Surfactant (ppm) | PP (° C.) |
|---|---|---|---|---|---|
| Paraffinic Crude oil |  |  | 0 | 0 | 27 |
| Surfactant |  |  | 0 | 1000 | 27 |
| 1  5% Additive in Xylene/Acetophenone 70/30 | EVA (20% VA, 20 g/10') | 25% | 50 | 1000 | 18 |
|  | EVA (28% VA, 40 g/10') | 25% |  |  |  |
|  | EVA (33% VA, 45 g/10') | 25% | 1000 | 1000 | 9 |
|  | EVA (40% VA, 60 g/10') | 25% |  |  |  |
| 2  8% Additive in Xylene/Acetophenone 70/30 | EVA (20% VA, 20 g/10') | 25% | 1000 | 1000 | 9 |
|  | EVA (28% VA, 40 g/10') | 25% |  |  |  |
|  | EVA (33% VA, 45 g/10') | 25% |  |  |  |
|  | EVA (40% VA, 60 g/10') | 25% |  |  |  |
| 3  10% Additive in Xylene/Acetophenone 70/30 | EVA (20% VA, 20 g/10') | 25% | 1000 | 0 | 9 |
|  | EVA (28% VA, 40 g/10') | 25% |  |  |  |
|  | EVA (33% VA, 45 g/10') | 25% | 1000 | 1000 | 9 |
|  | EVA (40% VA, 60 g/10') | 25% |  |  |  |
| 4  5% Additive in Xylene | EVA (20% VA, 20 g/10') | 25% | 200 | 1000 | 18 |
|  | EVA (28% VA, 40 g/10') | 25% | 500 | 1000 | 12 |
|  | EVA (33% VA, 45 g/10') | 25% | 1000 | 1000 | 9 |
|  | EVA (40% VA, 60 g/10') | 25% | 1500 | 1000 | 9 |
| 5  5% Additive in Xylene/Acetophenone 70/30 | EVA (18% VA, 150 g/10') | 25% | 50 | 1000 | 12 |
|  | EVA (28% VA, 800 g/10') | 25% |  |  |  |
|  | EVA (33% VA, 45 g/10') | 25% | 1000 | 1000 | 9 |
|  | EVA (39% VA, 60 g/10') | 25% |  |  |  |
| 6  5% Additive in Xylene | EVA (18% VA, 150 g/10') | 25% | 200 | 1000 | 12 |
|  | EVA (28% VA, 800 g/10') | 25% | 500 | 1000 | 12 |
|  | EVA (33% VA, 45 g/10') | 25% | 1000 | 1000 | 9 |
|  | EVA (39% VA, 60 g/10') | 25% | 1000 | 200 | 9 |
| 7  5% Additive in Xylene | EVA (20% VA, 20 g/10') | 17% | 1000 | 1000 | 9 |
|  | EVA (28% VA, 800 g/10') | 35% |  |  |  |
|  | EVA (39% VA, 60 g/10') | 48% |  |  |  |
| 8  5% Additive in Xylene | EVA (20% VA, 20 g/10') | 17% | 1000 | 1000 | 6 |
|  | EVA (28% VA, 800 g/10') | 33% |  |  |  |
|  | EVA (39% VA, 60 g/10') | 17% |  |  |  |
|  | Polyacrylate $C_{18}$-$C_{22}$ | 33% |  |  |  |
| 9  5% Additive in Xylene | EVA (20% VA, 20 g/10') | 17% | 1000 | 1000 | 3 |
|  | EVA (28% VA, 800 g/10') | 33% |  |  |  |
|  | EVA (39% VA, 60 g/10') | 17% |  |  |  |
|  | Polyacrylate $C_{12}$-$C_{22}$ | 33% |  |  |  |
| 10  5% Additive in Xylene | EVA (20% VA, 20 g/10') | 10% | 500 | 200 | 9 |
|  | EVA (28% VA, 800 g/10') | 50% | 750 | 200 | 3 |
|  | EVA (39% VA, 60 g/10') | 10% | 1000 | 200 | 3 |
|  | Polyacrylate $C_{12}$-$C_{22}$ | 30% | 1500 | 200 | 3 |
| 11  5% Additive in Xylene | EVA (18% VA, 150 g/10') | 10% | 1000 | 200 | 9 |
|  | EVA (28% VA, 800 g/10') | 32% |  |  |  |
|  | Polyacrylate $C_{12}$-$C_{22}$ | 26% |  |  |  |
|  | EVA (39% VA, 60 g/10') | 32% |  |  |  |
| 12  5% Additive in Xylene | EVA (23% VA, 5.5 g/10') | 52% | 1000 | 200 | 0 |
|  | EVA (33% VA, 45 g/10') | 30% |  |  |  |
|  | EVA (39% VA, 60 g/10') | 18% |  |  |  |
| 13  5% Additive in Xylene | Polyacrylate $C_{12}$-$C_{18}$ | 25% | 1000 | 200 | 3 |
|  | Polyacrylate $C_{18}$-$C_{22}$ | 10% |  |  |  |
|  | EVA (18% VA, 150 g/10') | 7% |  |  |  |
|  | EVA (23% VA, 5.5 g/10') | 11% |  |  |  |
|  | EVA (28% VA, 150 g/10') | 13% |  |  |  |
|  | EVA (33% VA, 45 g/10') | 16% |  |  |  |
|  | EVA (39% VA, 60 g/10') | 18% |  |  |  |
| 14  5% Additive in Xylene | Polyacrylate $C_{12}$-$C_{22}$ | 26% | 1000 | 200 | 3 |
|  | EVA (18% VA, 150 g/10') | 7% |  |  |  |
|  | EVA (23% VA, 5.5 9/10') | 12% |  |  |  |
|  | EVA (28% VA, 150 g/10') | 15% |  |  |  |
|  | EVA (33% VA, 45 g/10') | 20% |  |  |  |
|  | EVA (39% VA, 60 g/10') | 20% |  |  |  |
| 15  5% Additive in Xylene | EVA (20% VA, 20 g/10') | 10% | 1000 | 200 | 3 |
|  | EVA (28% VA, 25 g/10') | 50% |  |  |  |
|  | EVA (39% VA, 60 g/10') | 10% |  |  |  |
|  | Polyacrylate $C_{12}$-$C_{22}$ | 30% |  |  |  |
| 16  5% Additive in Xylene | EVA (23% VA, 5.5 g/10') | 47% | 1000 | 200 | −6 |
|  | EVA (33% VA, 45 g/10') | 25% |  |  |  |
|  | EVA (39% VA, 60 g/10') | 18% |  |  |  |
|  | Polyacrylate $C_{12}$-$C_{22}$ | 10% |  |  |  |

The mixtures of additives tested (examples 1-16), added to the paraffinic crude oil in concentrations equal to 1,000 ppm by weight, produced reductions in the Pour Point down to −6° C., whereas the EVA products or polyalkylacrylates added individually (final concentration in the crude oil of 1,000 ppm) led to poorer decreases in the Pour Point (examples A-N and P). This confirms the synergic effect of the EVA grades, characterized by different contents of VA comonomer, in reducing the gel point in the tested "waxy crude oil" for co-crystallization with a wider range of n-paraffins.

It should be noted that some of the additives used proved to be almost completely inefficient if added alone, whereas they produced significant reductions in the PP when mixed with other products. In particular, in examples 1-2-3-4, it can be observed how the addition of as little as 250 ppm of an additive which individually proved to be poorly effective (example E), causes, when mixed with other EVA copolymers, a further lowering of the PP with respect to the additive used alone in a concentration equal to 1,000 ppm. It should be noted that the other EVA copolymers used in the mixtures of examples 1, 2, 3 and 4 proved to be ineffective (examples B-H-I) when used individually.

The formulations were conceived according to the criteria described above, i.e. mixtures of EVA copolymers were prepared, consisting of copolymers characterized by differences in percentage of VA higher than 5% and, preferably equal to at least 7%. The PP tests carried out with mixtures consisting of copolymers having closer VA contents, in fact, indicated that the use of a greater number of EVA copolymers having similar percentages of comonomer (ΔVA≤5%) does not imply a significant improvement in the efficacy of the additive (see examples 1-7), particularly if used in the absence of the polyalkylmethacrylate adjuvant.

Finally, the best results in lowering the Pour Point were obtained by testing mixtures of EVA copolymers with different VA contents, to which polyalkylmethacrylates characterized by $C_{12}$-$C_{22}$ side-chains, were added. The addition of these products, in fact, led to a further enlargement of the distribution of polyethylene sections in the additive, capable of co-crystallizing with the n-paraffins present in the crude oil.

The invention claimed is:

1. A polymeric composition suitable for lowering the Pour Point of paraffinic crude oils comprising a synergic mixture comprising at least two ethylene-vinyl acetate (EVA) copolymers having an average molecular weight $M_w$ ranging from 25,000 to 100,000 Dalton (measured via GPC), a content of vinyl acetate (VA) monomer ranging from 15 to 50% by weight, respectively, with the proviso that the content of vinyl acetate monomer in the respective at least two ethylene-vinyl acetate copolymers differs from one another by a value higher than 5% on a weight basis,
    wherein the synergic mixture does not comprise an alkyl (meth)acrylate polymer.

2. The polymeric composition according to claim 1, wherein the number of EVA copolymers in the synergic mixture ranges from 2 to 6.

3. The polymeric composition according to claim 1, wherein the EVA copolymers have a weight average molecular weight $M_w$ ranging from 25,000 to 80,000 Dalton.

4. The polymeric composition according to claim 1, wherein the content of VA comonomers, on a weight basis, differs from one copolymer to another by a value from 7 to 22%.

5. The polymeric composition according to claim 1, wherein the synergic mixture comprises three EVA copolymers having a content of vinyl acetate comonomer of 20, 30 and 40% by weight, respectively.

6. The polymeric composition according to claim 1, wherein the synergic mixture comprises three EVA copolymers having a content of vinyl acetate comonomer of 24, 33 and 40% by weight, respectively.

7. The polymeric composition according to claim 1, wherein the concentration of a single EVA copolymer, in the synergic mixture, is equal to or higher than 5% by weight.

8. The polymeric composition according to claim 7, wherein the concentration of said single EVA copolymer in the synergic mixture ranges from 10 to 60% by weight.

9. A process for the lowering the Pour Point of a paraffinic crude oil having a paraffin content higher than 5% by weight, which comprises adding, to the paraffinic crude oil, from 50 to 1,500 ppm (by weight), with respect to the crude oil, a synergic mixture comprising at least two ethylene-vinyl acetate copolymers respectively having an average molecular weight $M_w$ ranging from 25,000 to 100,000 Dalton (measured via GPC), a content of vinyl acetate monomer ranging from 15 to 50% by weight, with the proviso that the content of vinyl acetate monomer in the respective at least two ethylene-vinyl acetate copolymers differs by a value higher than 5% on a weight basis,
    wherein the synergic mixture does not comprise an alkyl (meth)acrylate polymer.

10. The process according to claim 9, which comprises:
    a. dissolving the synergic mixture in an organic solvent to obtain a solution (a),
    b. adding the solution (a) to the paraffinic crude oil at the fluidification temperature of the crude oil, with a concentration of the synergic mixture in the crude oil ranging from 50 to 1,500 ppm.

11. The process according to claim 10, wherein the solution (a) comprises from 1 to 10% by weight of the synergic mixture.

12. The process according to claim 10, wherein the organic solvent is an aromatic hydrocarbon, an aliphatic hydrocarbon, a polar solvent, or mixtures thereof.

13. The process according to claim 9, wherein the synergic mixture is added to the paraffinic crude oil together with a surfactant with a hydrophilic lipophilic balance (HLB), higher than or equal to 10.

14. A paraffinic crude oil having a Pour Point lower than 10° C. comprising:
    i. a paraffinic crude oil with an average content of paraffins higher than 5% by weight; and
    ii. 50-1,500 ppm (by weight) with respect to the crude oil of a synergic composition comprising at least two ethylene-vinyl acetate copolymers having a weight average molecular weight $M_w$ ranging from 25,000 to 100,000 Dalton (measured via GPC), a content of vinyl acetate monomer ranging from 15 to 50% by weight, with the proviso that the content of vinyl acetate monomer in the respective at least two ethylene-vinyl acetate copolymers differs from one another by a value higher than 5% on a weight basis,
    wherein the synergic composition does not comprise an alkyl(meth)acrylate polymer.

* * * * *